(12) United States Patent
Santharam

(10) Patent No.: US 12,248,609 B2
(45) Date of Patent: *Mar. 11, 2025

(54) CHAT ATTACHMENT SCREENING

(71) Applicant: INTUIT INC., Mountain View, CA (US)

(72) Inventor: Sangeetha Uthamalingam Santharam, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 18/362,081

(22) Filed: Jul. 31, 2023

(65) Prior Publication Data

US 2024/0037273 A1 Feb. 1, 2024

Related U.S. Application Data

(63) Continuation of application No. 17/876,698, filed on Jul. 29, 2022, now Pat. No. 11,755,774.

(51) Int. Cl.
*G06F 21/62* (2013.01)
*G06F 3/0484* (2022.01)
*G06V 30/19* (2022.01)
*G06V 30/413* (2022.01)
*H04L 51/08* (2022.01)

(52) U.S. Cl.
CPC ........ *G06F 21/6245* (2013.01); *G06F 3/0484* (2013.01); *G06V 30/19* (2022.01); *G06V 30/413* (2022.01); *H04L 51/08* (2013.01)

(58) Field of Classification Search
CPC ... G06F 21/6245; G06F 3/0484; G06V 30/19; G06V 30/413; H04L 51/08
See application file for complete search history.

(56) References Cited

U.S. PATENT DOCUMENTS

| | | |
|---|---|---|
| RE47,037 E | 9/2018 | Wyle |
| 11,755,774 B1 * | 9/2023 | Santharam ............ G06F 3/0484 726/28 |
| 2017/0091466 A1 * | 3/2017 | Meyer ..................... G06F 21/32 |
| 2018/0350180 A1 | 12/2018 | Onischuk |
| 2019/0065537 A1 | 2/2019 | Goldbrenner et al. |
| 2019/0228474 A1 | 7/2019 | Ciaramitaro et al. |
| 2020/0344219 A1 | 10/2020 | Malhotra et al. |

* cited by examiner

*Primary Examiner* — Oleg Korsak
(74) *Attorney, Agent, or Firm* — Patterson + Sheridan, LLP

(57) ABSTRACT

Certain aspects of the present disclosure provide techniques and systems for screening chat attachments. A chat attachment screening system monitors a chat window of a first computing device associated with a first user during an interaction session between the first user and a second user. An upload of an attachment is detected based on the monitoring. Access to the attachment from a second computing device associated with the second user is blocked, in response to detecting the upload. Content from the attachment is identified and extracted. A type of the attachment is determined based on the content. A determination is made as to whether the second user is authorized to access the type of the attachment. An indication of the determination is presented on at least one of the first computing device or the second computing device during the interaction session.

20 Claims, 11 Drawing Sheets

CHAT ATTACHMENT SCREENING

CROSS-REFERENCE TO RELATED APPLICATIONS

The present patent application is a continuation of, and hereby claims priority under 35 U.S.C. § 120 to, pending U.S. patent application Ser. No. 17/876,698, entitled "CHAT ATTACHMENT SCREENING," by the same inventors, filed on Jul. 29, 2022, the contents of which are herein incorporated in their entirety by reference for all purposes.

INTRODUCTION

Aspects of the present disclosure relate to screening chat attachments, and more specifically to techniques for determining accessibility to chat attachments in specialized applications.

Online applications take many forms and cover many contexts. As the sophistication (and ubiquity) of such applications increases, so too does the volume of requests for help from users of those applications. Such applications may provide application features that allow users of the applications to interact with other specialized users for help during their interaction with the application. For example, such applications may allow users to start a chat session and interact with other specialized users during the chat session. In many cases, the applications may also allow users to share documents as part of the chat session.

In some instances, however, users may attempt to share documents with sensitive information (e.g., personal information, tax information, financial information, etc.) and may not know whether it is safe to share such documents with a specialized user during a chat session. Additionally, a given specialized user interacting with a user of the application during a chat session may not know whether the specialized user is authorized to access information within documents shared by a user. For example, the specialized user may be providing assistance to multiple different users in multiple different engagements (or chat sessions).

Accordingly, techniques are needed to determine accessibility to chat attachments during chat sessions between users.

SUMMARY

Certain embodiments provide a method. The method generally includes monitoring a chat window of a first user interface of a first computing device associated with a first user during an interaction session between the first user of an application and a second user of the application. The chat window includes one or more elements for uploading at least one attachment. The method also includes detecting, based on the monitoring, an upload of the at least one attachment. The method also includes blocking access to the at least one attachment from a second computing device associated with the second user, in response to detecting the upload of the at least one attachment. The method also includes identifying and extracting content from the at least one attachment. The method also includes determining a type of the at least one attachment based on the content. The method also includes determining whether the second user is authorized to access the type of the at least one attachment. The method further includes presenting an indication of the determination of whether the second user is authorized to access the type of the at least one attachment on at least one of the first user interface or a second user interface of a second computing device associated with the second user during the interaction session.

Other embodiments provide a method of screening a chat attachment. The method generally includes monitoring a chat window of a first user interface of a first computing device associated with a first user during an interaction session between the first user of an application and a second user of the application. The chat window includes one or more elements for uploading at least one attachment. The method also includes detecting, based on the monitoring, an upload of the at least one attachment. The method also includes, in response to detecting the upload of the at least one attachment, blocking access to the at least one attachment from a second computing device associated with the second user. The method also includes, while access to the at least one attachment is blocked: storing the at least one attachment in a first storage system that is inaccessible by a second computing device associated with the second user; retrieving the at least one attachment from the first storage system; identifying and extracting content from the at least one attachment retrieved from the first storage system; determining a type of the at least one attachment based on the content; and determining whether the second user is authorized to access the type of the at least one attachment. The method further includes upon determining that the second user is authorized to access the type of the at least one attachment, unblocking access to the at least one attachment from the second computing device, comprising storing the at least one attachment in a second storage system that is accessible by the second computing device. The method further includes upon determining that the second user is unauthorized to access the type of the at least one attachment: continuing to block access to the at least one attachment from the second computing device; and removing the at least one attachment from the first storage system.

Other embodiments provide processing systems configured to perform the aforementioned methods as well as those described herein; non-transitory, computer-readable media comprising instructions, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
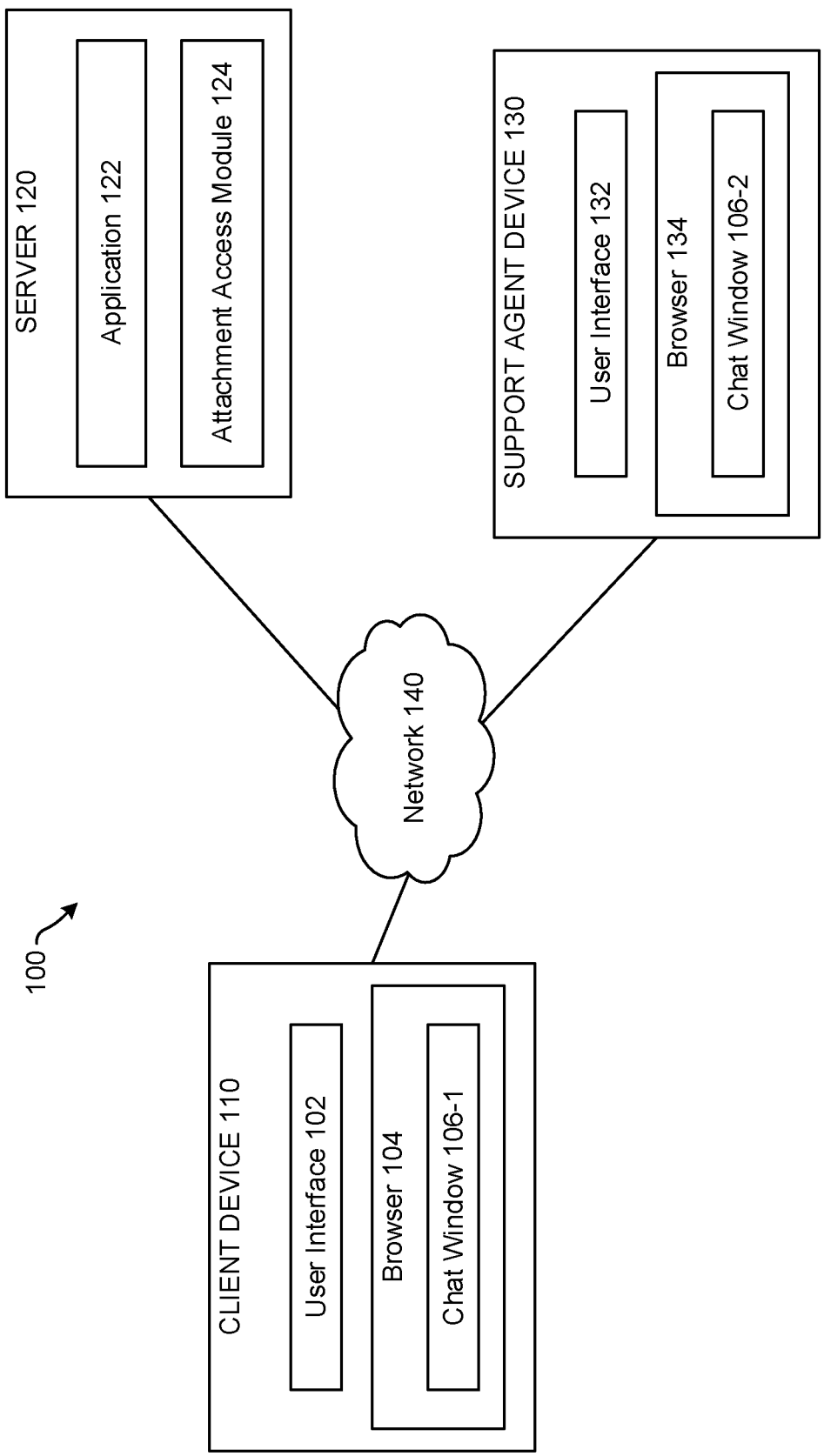
FIG. 1 depicts an example computing environment in accordance with certain embodiments.

Aspects of the present disclosure provide apparatuses, methods, processing systems, and computer readable mediums for screening chat attachments to determine whether a user is authorized to access content of the chat attachments.

As noted above, many applications allow users to interact (e.g., via chat sessions) with other specialized users for assistance with the application. For example, software applications used to prepare and file tax return documents may provide functionality that allows users of the applications to interact (e.g., chat) with (human or virtual) tax experts for help with preparing and filing tax returns. In some instances, a user may also attempt to share documents with the specialized user during the chat session. For example, in a chat session provided by an application used to prepare and file tax return documents, the user may share various different types of documents with financial information (e.g., wage statements, retirement statements, bank statements, insurance contracts, etc.) with a tax expert.

In many instances, however, the user may not know whether it is safe to share documents with sensitive information with another specialized user, such as a tax expert. For example, conventional applications that allow users to share documents during interactive sessions may not filter (or screen) which content of an attachment the specialized user is allowed to access. This lack of attachment screening may lead to users losing trust in the application and/or abandoning the application.

Additionally, in many instances, the specialized user (e.g., tax expert, support agent, etc.) may not know whether they are allowed to access information within a chat attachment. For example, certain specialized users may be authorized to view certain types of information (e.g., personal tax information) and may not be authorized to view other certain types of information (e.g., business tax information). Consequently, in some cases, a specialized user may inadvertently gain visibility to information that the specialized user is unauthorized (e.g., lacks permissions) to access. This access can lead to legal and compliance issues for the specialized user and the application.

The present disclosure provides techniques that allows for screening a chat attachment in instances where a user uploads the chat attachment during an interactive chat session with another user (e.g., a specialized user, such as a tax expert). In certain embodiments, an application can monitor a chat session and detect when an attachment has been uploaded by a user. In response to detecting an attachment, the application can temporarily block access to the attachment by the specialized user. While the access is blocked, the application can evaluate the attachment to determine a type of the attachment (e.g., whether the attachment includes sensitive information, a type of the sensitive information, etc.) The application may then determine whether the specialized user is authorized to access the type of the attachment, and may present an indication of the determination of whether the specialized user is authorized to access the type of the attachment to the user and/or the specialized user.

When the specialized user is authorized, the application may unblock access to the attachment and allow the attachment to be accessed (e.g., opened or downloaded) by the specialized user. When the specialized user is unauthorized, the application may continue blocking access to the attachment. In these instances, the application may also send an indication to the user that the attachment is not allowed to be uploaded for the particular chat session and/or send an indication to the specialized user that the attachment cannot be accessed by the specialized user.

In this manner, certain embodiments described herein provide techniques that allow an application to determine whether certain specialized users are authorized to access information within attachments that are shared during interactive chat sessions between specialized users and users of the application. This allows for a safer application experience, by (i) identifying and preventing the user from uploading documents in a chat session, based on the type of engagement the user is in, (ii) identifying and preventing the specialized user from accessing documents the specialized user is unauthorized to access for certain types of engagements, and (iii) providing indications to both the user and specialized user when an attachment is allowed and disallowed.

FIG. 1 illustrates an example computing environment 100 in accordance with certain embodiments of the present disclosure. Generally, FIG. 1 and the following description are intended to provide a brief, general description of a suitable computing environment in which the embodiments described herein may be implemented. As shown, computing environment 100 includes a client device 110, a server 120, and a support agent device 130, which are interconnected via a network 140, such as a local area network, personal area network, cellular network, or wide area network (e.g., the Internet).

A user (e.g., customer) may use the client device 110 to interact with the server 120 and/or other computing systems (e.g., support agent device 130). Similarly, a user (e.g., specialized user, such as a support agent) may use the support agent device 130 to interact with the server 120 and/or other computing systems (e.g., client device 110). Each of the client device 110 and the support agent device 130 is representative of a variety of computing devices, including, for example, a personal computer, a laptop, a tablet computer, a notebook, a personal digital assistant (PDA), a mobile device, or any other computing device capable of communicating with the server 120 across network 140. The client device 110 includes a user interface 102 and a browser 104, and the support agent device 130 includes a user interface 132 and a browser 134. The client device 110 may access the browser 104 via the user interface 102. Similarly, the support agent device 130 may access the browser 134 via the user interface 132.

The browsers 104, 134 can be used to access web and application services provided by the server 120. As shown, the server 120 provides a web application 122. The browsers 104, 134 can communicate with the server 120 to render web pages from the web application 122. The browsers 104, 134 can use any number of communication methods to communicate with the server 120, including remote procedure calls, application programming interface (API) calls, Simple Object Access Protocol (SOAP)-based web services, remote file access, proprietary client-server architectures, and the like. Functionality attributed to the web application 122 may be applied using code executed by the server 120, code executed by the client device 110 via the browser 104 (or code executed by the support agent device 130 via the browser 134), or a combination of both server-side code and client-side code. Note that, in certain embodiments, a stand-alone dedicated application that executes on the client device 110 and support agent device 130 may be used instead of the browsers 104 and 134, respectively.

Server 120 can include a physical computing system(s) and/or virtual server device(s) (for example, in a data center) that execute online applications, including one or more services that perform functions associated with online applications (e.g., web application 122). In certain embodiments, the server 120 can be modeled as a web server(s), application server(s), and a database(s) that provide the service back-end for the web application 122. In such embodiments, the web server(s) may communicate with the application server(s) to respond to requests from browsers 104, 134 on the client device 110 and the support agent device 130, respectively. The web server(s) and/or application server(s) may retrieve application content from the database(s) to respond to requests from the browsers 104, 134 and/or store application content into the database(s).

The application server(s) may execute a number of components (also referred to as modules) to provide web-based and other content to the client device 110 and support agent device 130. The application server(s) include application content (e.g., graphical user interface (GUI) components) that the server 120 can present on the user interface 102 of client device 110 and/or the user interface 132 of support agent device 130. The application content that is presented may be based on a user's (e.g., customer, support agent, etc.) interaction with the web application 122 provided by the server 120. For example, the web application 122 may be used to prepare and file tax return documents and may present application content which guides a user through preparing a tax return as well as provide the user with access to a variety of related features (e.g., customer support). In another example, the web application 122 may be a financial management application that allows users to track and manage finances, monitor credit reports, set up bank accounts, build portfolios, trade shares, etc.

The application content can include, for example, HyperText Markup Language (HTML) components or code that generates HTML components that can be passed to client device 110 and support agent device 130 and rendered as a user interface. The application content may additionally include instructions executable by client device 110 and support agent device 130 to display on the user interfaces 102, 132 using language-specific or operating systems-specific application content (e.g., instructions for generating/displaying javascript based components or similar components on other operating system platforms, Abstract Window Toolkit or Swing API components on the Java platform, and so on. Generally, instructions capable of rendering application content on client device 110 and support agent device 130 may include computer executable code generated from compiling and/or interpreting C (or variants thereof), Java, PHP, Ruby, HTML, javascript, Python, AJAX, VBscript, and other programming or scripting languages used to compose and present application content.

In certain embodiments, the web application 122 allows users to interact with support agents via interactive chat sessions (also referred to as text-based support 'chat' threads or text-based support 'chat' channels). For example, a user, such as a customer, may use a chat window 106-1 provided by the web application 122 to chat with a support agent associated with the application 122. Similarly, a user, such as a support agent, may use a chat window 106-2 provided by the web application 122 to chat with a customer interacting with the web application 122. Through the chat session, the support agent may provide assistance (or help) to the customer interacting with the application 122. Assuming the web application 122 provides tax preparation/filing services, the support agent may answer questions from the customer regarding how to prepare a tax return (e.g., certain tax deductions, certain tax expenses, etc.).

In some cases, the user may share documents with the support agent during the interactive chat session. Continuing with the tax preparation example, the user may share certain financial documents (e.g., wage and tax statements, insurance documents, etc.) with the support agent in order to get the support agent's assistance/advice on the financial documents. In the embodiment depicted in FIG. 1, the chat window 106-1 may include one or more elements (e.g., buttons, prompts, etc.) that allow the user to attach and upload documents to the server 120. For example, the documents may be uploaded to a storage system (e.g., database) within (or otherwise accessible to) the server 120. Additionally, in the embodiment depicted in FIG. 1, the chat window 106-2 may include one or more elements that allow the support agent to retrieve (e.g., download) the documents from the server 120. For example, the support agent may receive an indication from the web application 122 when the user has uploaded documents and may retrieve the documents from the storage system where the documents have been uploaded.

In certain embodiments, the server 120 is configured to screen the attachments (e.g., documents) uploaded by the user to determine whether the support agent is authorized to access the content of the attachments. As shown, the server 120 includes an attachment access module 124, which is configured to implement the techniques described herein for determining accessibility to an attachment uploaded by a user during an interactive chat session. The attachment access module 124 may include hardware components, software components, or combinations thereof. Note, the attachment access module 124 is described in greater detail below.

Note that FIG. 1 illustrates a reference example of a computing environment in which the techniques described herein may be implemented and that the techniques described herein may be implemented in other computing environments consistent with the functionality described herein. For example, while FIG. 1 describes a user and a (human) support agent interacting with each other via an interactive chat session provided by the web application 122, in certain embodiments, the user may interact with a non-human user (or automated "virtual support agent") (e.g., a chatbot) provided by the web application 122. In such embodiments, the automated virtual support agent may be located within the server 120 or on another computing system (e.g., support agent device 130).

Figure 2:
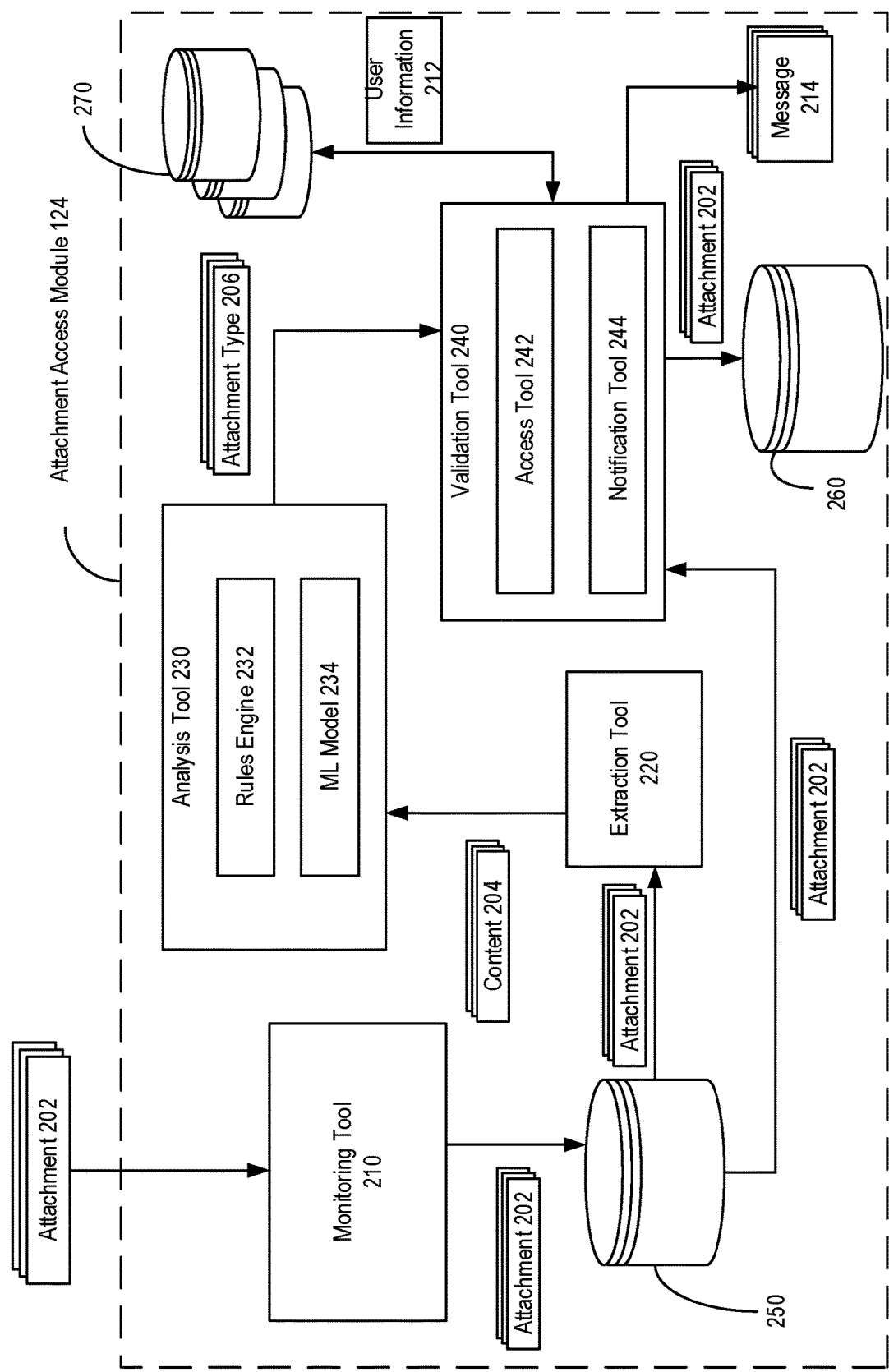
FIG. 2 further illustrates certain components of the computing environment depicted in FIG. 1, in accordance with certain embodiments.

FIG. 2 further illustrates certain components (e.g., attachment access module 124) of the computing environment depicted in FIG. 1, in accordance with certain embodiments. As shown, the attachment access module 124 includes a monitoring tool 210, extraction tool 220, analysis tool 230, validation tool 240, and storage systems 250, 260, and 270, each of which can include hardware components, software components, or combinations thereof.

The monitoring tool 210 is generally configured to monitor an interactive chat session between a user and a (human or virtual) support agent. For example, the monitoring tool 210 may monitor the chat window 106-1 (including chat data) on the client device 110 (including chat data) to determine when the user has uploaded an attachment 202. In one embodiment, the monitoring tool 210 can detect an upload of an attachment 202 by determining when an attachment API provided the web application 122 for uploading attachments during the chat session is used by the user. For example, the monitoring tool 210 can determine that an attachment 202 has been uploaded when the attachment API is invoked (or called) by the client device 110.

In certain embodiments, in response to detecting an upload of an attachment 202, the monitoring tool 210 temporarily (e.g., for a first predetermined period (or amount) of time) blocks access to the attachment 202 by the (human or virtual) support agent. In one example, the monitoring tool 210 can block access to the attachment 202 by temporarily (e.g., for a period of time) locking the attachment 202 without allowing the support agent to download or open the attachment 202. In another example, the monitoring tool 210 may block access to the attachment 202 by at least one of (i) refraining from notifying the support agent during the chat session that the upload of the attachment 202 is completed and/or that the attachment 202 available for retrieval or (ii) refraining from storing the attachment in a storage system that is accessible to the support agent via the support agent device 130.

In the embodiment depicted in FIG. 1, the monitoring tool 210 stores the attachment 202 in a storage system 250. The storage system 250 (e.g., a database) may be used as a temporary storage system and may not be accessible by the support agent device 130. After the attachment 202 is stored in the storage system 250, the extraction tool 220 retrieves the attachment 202 from the storage system 250. The extraction tool 220 is generally configured to extract content 204 from the attachment 202. For example, the extraction tool 220 may open the attachment 202 from the storage system 250 and may identify and extract the content 204 using optical character recognition (OCR) or another type of content extraction tool. After extracting the content 204, the extraction tool 220 sends the content 204 to the analysis tool 230.

The analysis tool 230 is generally configured to determine a type of the attachment 202, based on the content 204 extracted from the attachment 202. In certain embodiments, the evaluation of the content 204 includes classifying the attachment 202 into one of multiple different types of attachments, based on the content 204. Continuing with the tax preparation example, the user may attempt to share different types of tax documents, including different types of personal tax documents, different types of business tax documents, etc. Examples of different personal tax documents can include, but are not limited to, wage and tax statements (e.g., Form W-2), miscellaneous income forms (e.g., Form 1099-MISC), dividends and distributions information (e.g., Form 1099-DIV), interest income information (e.g., Form 1099-INT), mortgage interest statements (e.g., Form 1098), certain government payments (e.g., 1099-G), distributions from pensions, annuities, retirement or profit-sharing plans, IRAs, insurance contracts, etc. (e.g., Form 1099-R), etc. Examples of different business tax documents can include, but are not limited to, profit/loss statements (e.g., Schedule C), partnership income (e.g., Form 1065), etc.

In certain embodiments, the analysis tool 230 evaluates the content 204 using a rules engine 232. For example, the rules engine 232 may include one or more predetermined rules for analyzing structured content of an attachment. For instance, certain documents (e.g., a wage or tax statement, such as a W-2 form) may include a structured data format (e.g., including variables corresponding to fields of the document). In these instances, the rules engine 232 can be configured to use predetermined rules (corresponding to a particular data format) to parse the structured data format for the content 204. In an exemplary document, such as a W-2 form, the rules engine 232 can extract data from fields of the W-2 form (e.g., employer identification number (EIN) field, fields a, b, c, d, and e, etc.).

In certain embodiments, the analysis tool 230 evaluates the content 204 using a machine learning (ML) model 234. For example, the analysis tool 230 may use the ML model 234 to evaluate unstructured content of an attachment. Certain attachments, for example, may contain the same information as a structured document, but may be presented in an unstructured format. For instance, a user may input data from one or more fields of a W-2 form into another document that does not have identifiable W-2 form fields. In such instances, the ML model 234 can be used to identify content in an unstructured format. The ML model 234 may be trained on a dataset, which includes different types of documents (e.g., different types of tax documents, including individual tax documents, business tax documents, etc.).

Based on evaluation of the content 204, the analysis tool 230 can generate a confidence score for each respective type of tax document. The analysis tool 230 may then select the type of tax document having the highest confidence score (among the set of confidence scores) as the attachment type 206 (corresponding to the attachment 202). The analysis tool 230 may send an indication of the attachment type 206 (corresponding to the attachment 202) to the validation tool 240.

The validation tool 240 is generally configured to validate access to an attachment 202 by a support agent via the support agent device 130. The validation tool 240 includes an access tool 242 and a notification tool 244. The validation tool 240 can use the access tool 242 to determine whether a support agent is authorized to access attachments having the attachment type 206. In certain embodiments, the access tool 242 may obtain user information 212 from a storage system 270 and may determine at least one of (i) a type of engagement between the user and the support agent or (ii) a set of permissions of the support agent from the user information 212. The access tool 242 can determine whether the support agent is authorized to access the attachment type 206, based on the attachment type 206, the type of engagement, and the set of permissions.

For example, if the attachment type 206 is a personal tax document (e.g., wage and tax statement), the type of engagement is related to support for a personal tax scenario, and the support agent has permissions for providing personal tax support, then the access tool 242 may determine that the support agent is authorized to access the attachment type 206. In another example, if the attachment type 206 is a business tax document (e.g., Schedule C form), the type of engagement is related to support for a business tax scenario, and the support agent has permissions for providing business tax support, then the access tool 242 may determine that the support agent is authorized to access the attachment type 206. In yet another example, if the attachment type 206 is a personal tax document (e.g., wage and tax statement) and at least one of (i) the type of engagement is unrelated to support for a personal tax scenario or (ii) the support agent lacks permissions for providing personal tax advice, then the access tool 242 may determine that the support agent is unauthorized to access the attachment type 206. Similarly, in yet another example, if the attachment type 206 is a business tax document and at least one of (i) the type of engagement is unrelated to support for a business tax scenario or (ii) the support agent lacks permissions for providing business tax advice, then the access tool 242 may determine that the support agent is unauthorized to access the attachment type 206.

When the support agent is authorized, then the access tool 242 validates permissions for the support agent to access the attachment 202 and may allow the support agent to access the attachment 202 via the support agent device 130. For example, the access tool 242 may unblock access to the attachment 202, allowing it to be downloaded or opened by the support agent device 130. In one example, the access tool 242 may retrieve the attachment 202 from the storage system, and store the attachment 202 in the storage system 260. The storage system 260 (e.g., database) may be accessible by the support agent device 130 during the interactive chat session. In some embodiments, the access tool 242 may delete (or remove) the attachment 202 from the storage system 250, once the attachment 202 is stored in the storage system 260.

When the support agent is unauthorized, then the access tool 242 continues blocking access to the attachment 202, preventing the support agent from downloading or opening it via the support agent device 130. The access tool 242 may refrain from storing the attachment 202 in the storage system 260, and may delete (or remove) the attachment 202 from the storage system 250. The access tool 242 may continue to block access to the attachment 202 for another predetermined period of time, for example, after the initial period of time has elapsed. In certain embodiments, the access tool 242 permanently blocks access to the attachment 202 (e.g., for a duration of the interactive chat session).

The notification tool 244 is generally configured to generate an indication (e.g., message(s) 214) of whether the attachment 202 is allowed for the interactive chat session. In certain embodiments, when access to the attachment 202 is authorized, the notification tool 244 can generate a (first) message 214 indicating that the attachment 202 has been successfully uploaded and shared with the support agent, and generate a (second) message 214 indicating that the attachment 202 is allowed to be accessed by the support agent. The notification tool 244 can present the (first) message 214 on the user interface 102 of the client device 110 and can present the (second) message 214 on the user interface 132 of the support agent device 130.

In certain embodiments, when access to the attachment 202 is unauthorized, the notification tool 244 can generate a (first) message 214 indicating that the attachment 202 is not allowed to be shared with the support agent during the interactive chat session, and generate a (second) message 214 indicating that the attachment 202 is not allowed to be accessed by the support agent. The notification tool 244 can present the (first) message 214 on the user interface 102 of the client device 110 and can present the (second) message 214 on the user interface 132 of the support agent device 130.

Figure 3:
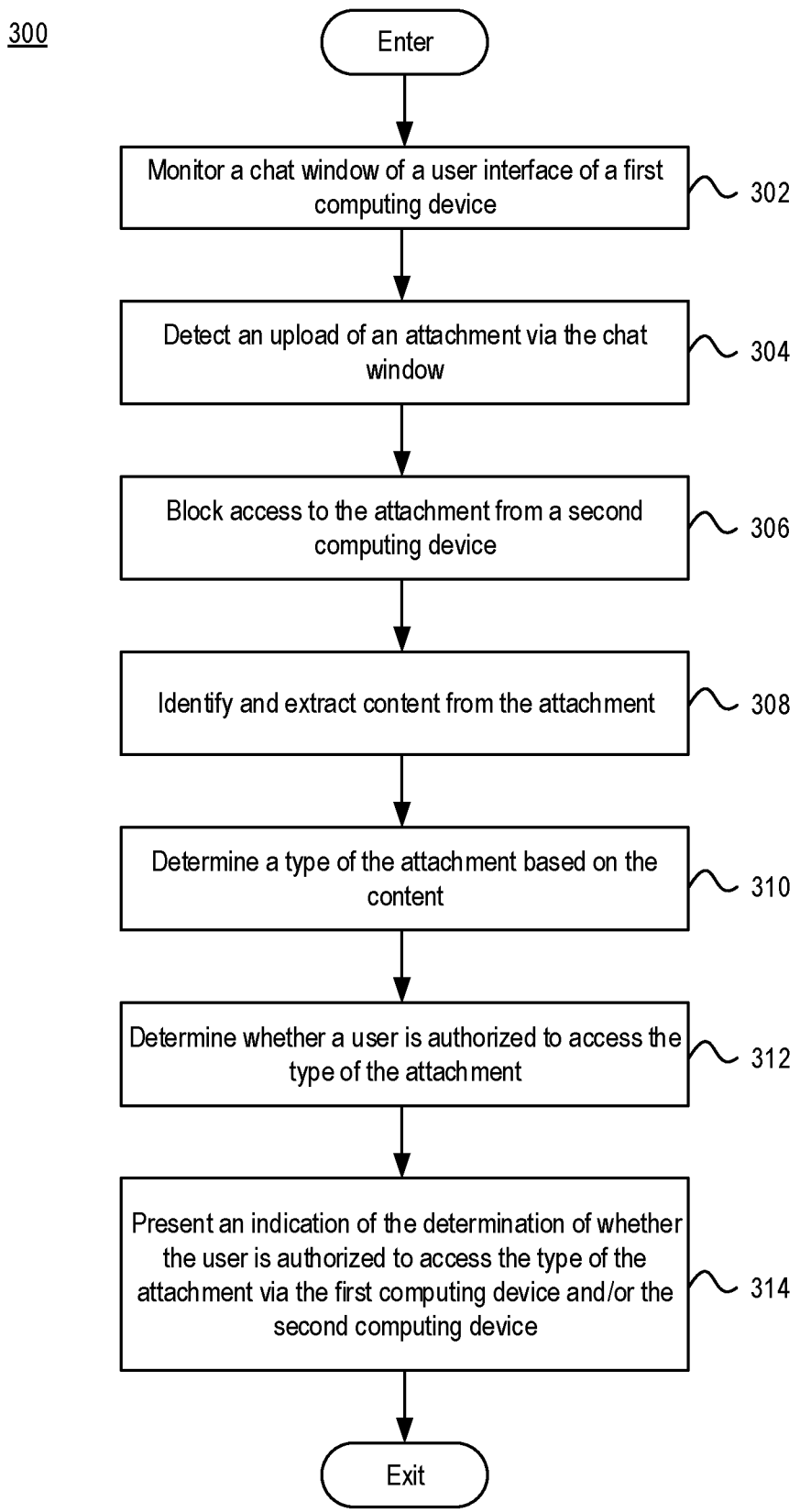
FIG. 3 illustrates an example flowchart for screening chat attachments, in accordance with certain embodiments.

FIG. 3 illustrates an exemplary flowchart 300 for screening chat attachments in accordance with certain aspects of the present disclosure. Flowchart 300 can be implemented by the server 120 of FIG. 1. FIG. 3 illustrates the functionality and operation of possible implementations of systems, methods and computer program products according to various embodiments of the present disclosure. In this regard, each block in the flowchart may represent a module, segment, or portion of code, which comprises one or more executable instructions for implementing the specified logical function(s). In some alternative implementations, the functions noted in the block may occur simultaneously, substantially concurrently, or out of the order noted in the figure. Each block of the flowchart and combinations of blocks in the flowchart can be implemented by special-purpose hardware-based systems that perform the specified functions or acts, or combinations of special purpose hardware and computer instructions.

At block 302, the server 120 monitors a chat window (e.g., chat window 106-1) of a user interface (e.g., user interface 102) of a first computing device (e.g., client device 110). At block 304, the server 120 detects an upload of an attachment (e.g., attachment 202) via the chat window. As noted, the server 120 may detect the upload of the attachment based on determining that an attachment API has been called or invoked by the first computing device.

At block 306, the server 120 blocks access to the attachment from (or by) a second computing device (e.g., support agent device 130). In certain embodiments, the server 120 blocks access to the attachment for a predetermined period of time. In certain embodiments, while access to the attachment is blocked for the predetermined period of time, the server 120 stores the attachment in a first storage system (e.g., storage system 250).

One or more of blocks 308, 310, 312, and 314 may be performed while access to the attachment is blocked for the predetermined period of time. At block 308, the server 120 identifies and extracts content (e.g., content 204) from the attachment. For example, the server 120 may retrieve the attachment from the first storage system and extract the content using OCR.

At block 310, the server 120 determines a type of the attachment (e.g., attachment type 206) based on the content. For example, the server 120 can evaluate the attachment (retrieved from the first storage system) using a rules engine (e.g., rules engine 232) or ML model (e.g., ML model 234) in order to determine the type of the attachment.

At block 312, the server 120 determines whether a user (e.g., support agent) is authorized to access the type of the attachment. As noted, in certain embodiments, the server 120 may determine whether the user is authorized to access the type of the attachment based on the type of the attachment, type of engagement for the interactive chat session, and permissions of the user, each of which may be obtained from a second storage system(s) (e.g., user information 212 from storage system(s) 270).

In certain embodiments, upon determining the user is authorized, the server 120 unblocks access to the attachment by the second computing device, e.g. after the predetermined period of time has elapsed. For example, the server 120 can store the attachment in a third storage system (e.g., storage system 260) accessible to the second computing device, and may delete (or remove) the attachment from the first storage system.

In certain embodiments, upon determining the user is unauthorized, the server 120 continues blocking access to the attachment by the second computing device for at least another predetermined period of time, e.g. after the initial predetermined period of time has elapsed. The server 120 may delete (or remove) the attachment from the first storage system.

At block 314, the server 120 presents an indication of the determination of whether the user is authorized to access the type of the attachment. The indication may be presented via the first computing device and/or the second computing device. For example, when the user is authorized, the indication can include (i) a first message (e.g., message 214) presented on the first computing device that indicates that the attachment has been successfully uploaded and shared with the support agent and (ii) a second message (e.g., message 214) presented on the second computing device that indicates that the attachment can be accessed by the support agent. On the other hand, when the user is unauthorized, the indication can include (i) a first message (e.g., message 214) presented on the first computing device that indicates that the attachment is not allowed to be shared with the support agent and (ii) a second message (e.g., message 214) presented on the second computing device that indicates that the attachment is not allowed to be accessed by the support agent.

Figure 4A:
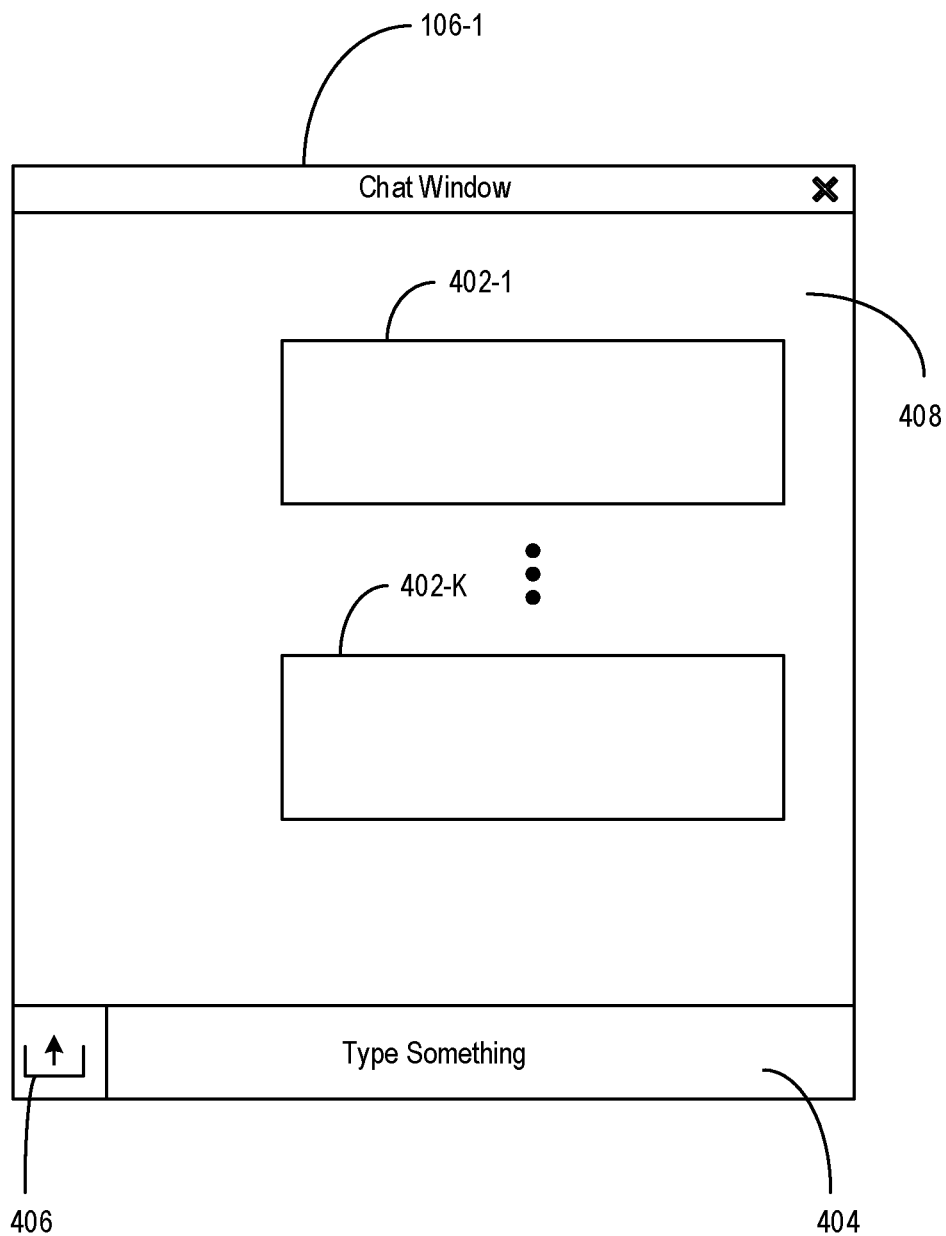
FIGS. 4A-4D illustrate different examples of a chat window that may be presented on a client device, in accordance with certain embodiments.

FIGS. 4A-4D illustrate different examples of a chat window (e.g., chat window 106-1) that may be presented on a user interface (e.g., user interface 102) of a client device (e.g., client device 110) during an interactive chat session between a user and a support agent, in accordance with certain aspects of the present disclosure. As shown in FIG. 4A, the chat window 106-1 includes a window 408 for displaying a text-based thread (or chat) between the user and the support agent. For example, the window 408 can display one or more text messages 402 1-K of the text-based thread. The chat window 106-1 also includes a window 404 that allows the user to enter text for sending a message, and a prompt 406 that allows the user to upload an attachment (e.g., attach a file).

Figure 4B:
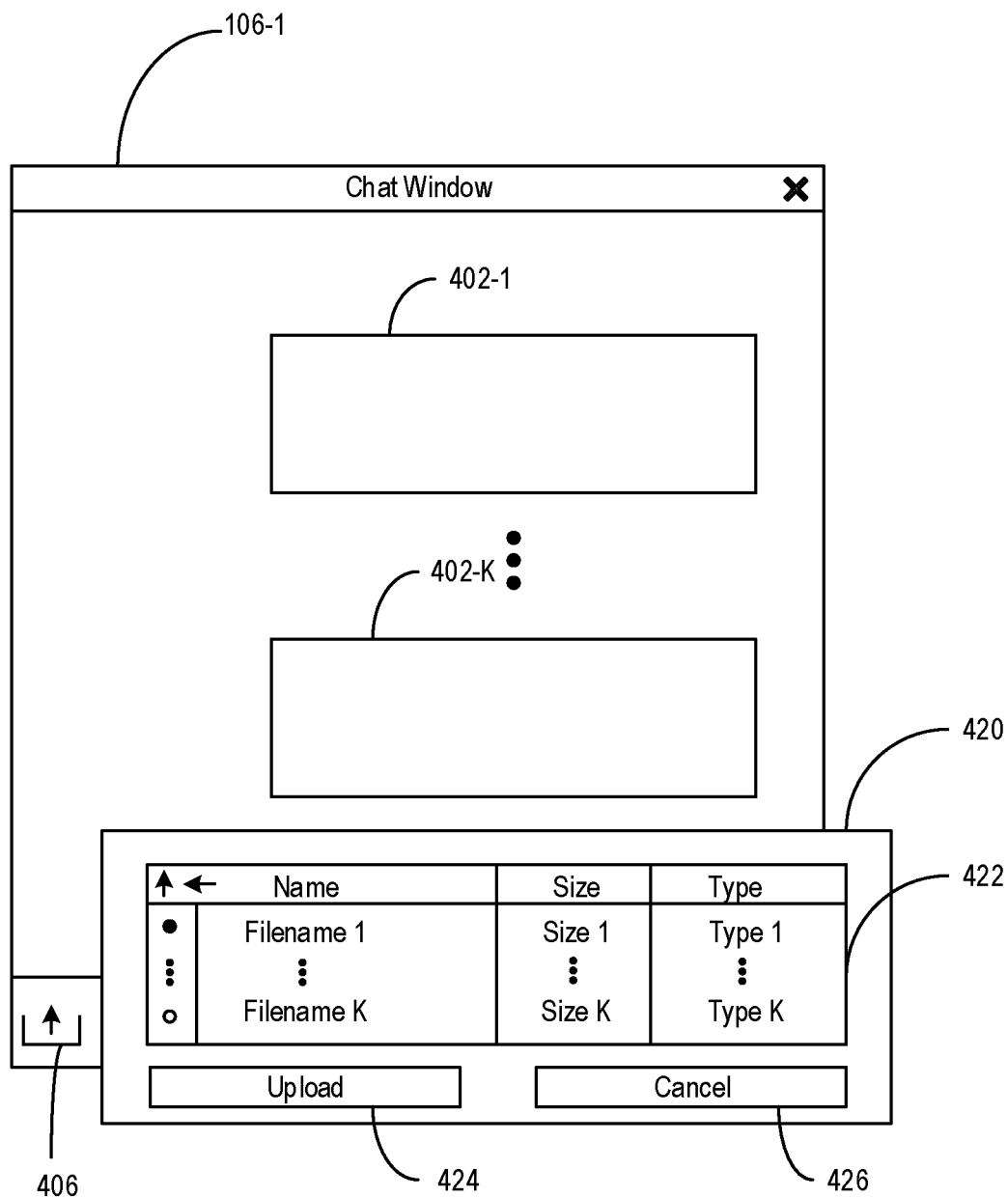
Figure 4C:
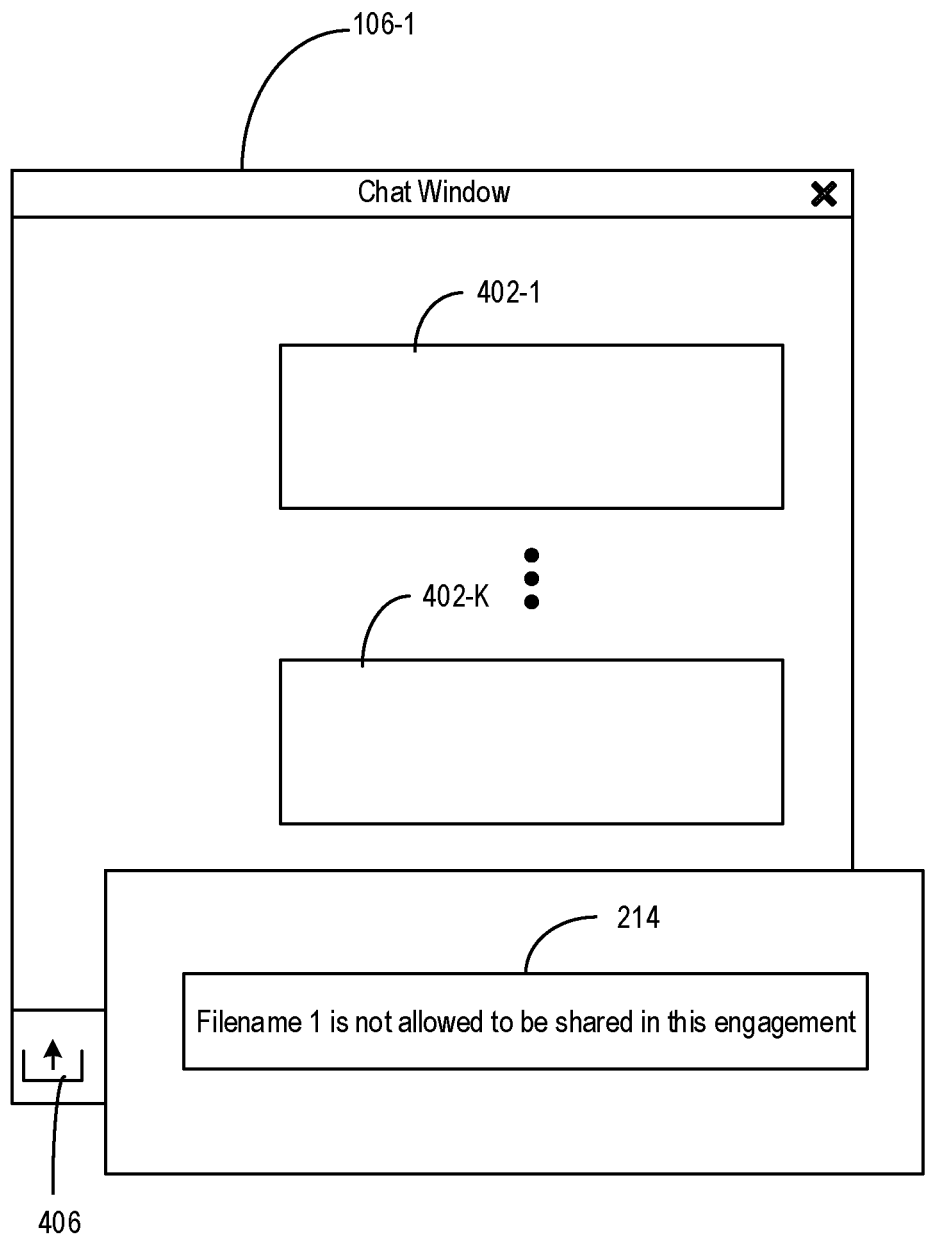
Figure 4D:
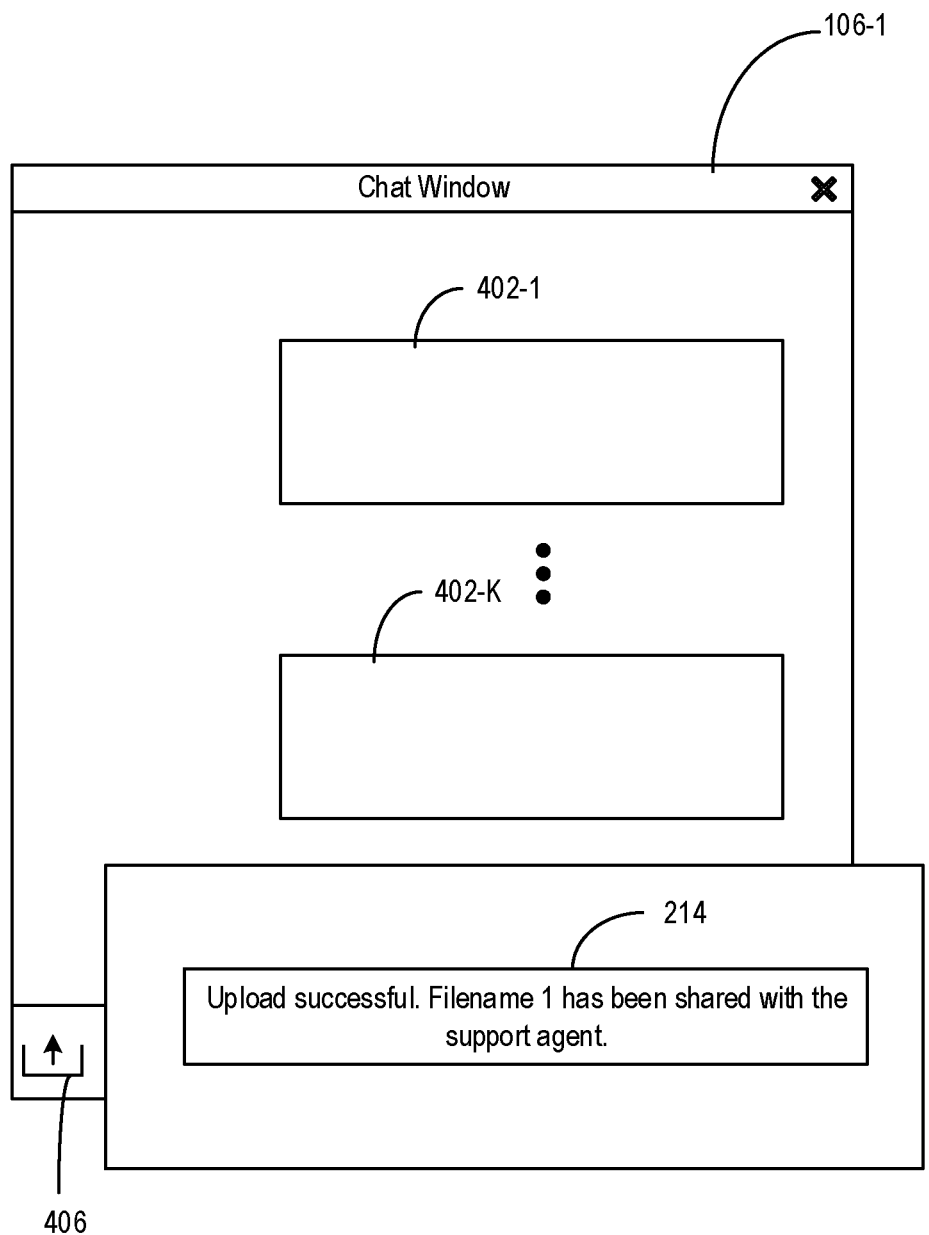

As shown in FIG. 4B, once the prompt 406 is selected, the chat window 106-1 presents a window 420, which includes a file viewer 422, a prompt 424 for uploading a file(s) selected from the file viewer 422, and a prompt 426 for exiting the window 420. Here, the user selects file "Filename 1" to share with the support agent during the chat session. As shown in FIG. 4C, in certain embodiments, after the user selects prompt 424 for the selected "Filename 1," the user may be presented with a message (e.g., message 214) indicating that "Filename 1 is not allowed to be shared in this engagement," when the server 120 determines that the support agent is unauthorized to access "Filename 1." On the other hand, as shown in FIG. 4D, after the user selects prompt 424 for the selected "Filename 1," the user may be presented with a message (e.g., message 214) indicating that "Upload successful. Filename 1 has been shared with the support agent," when the server 120 determines that the support agent is authorized to access "Filename 1."

Figure 5A:
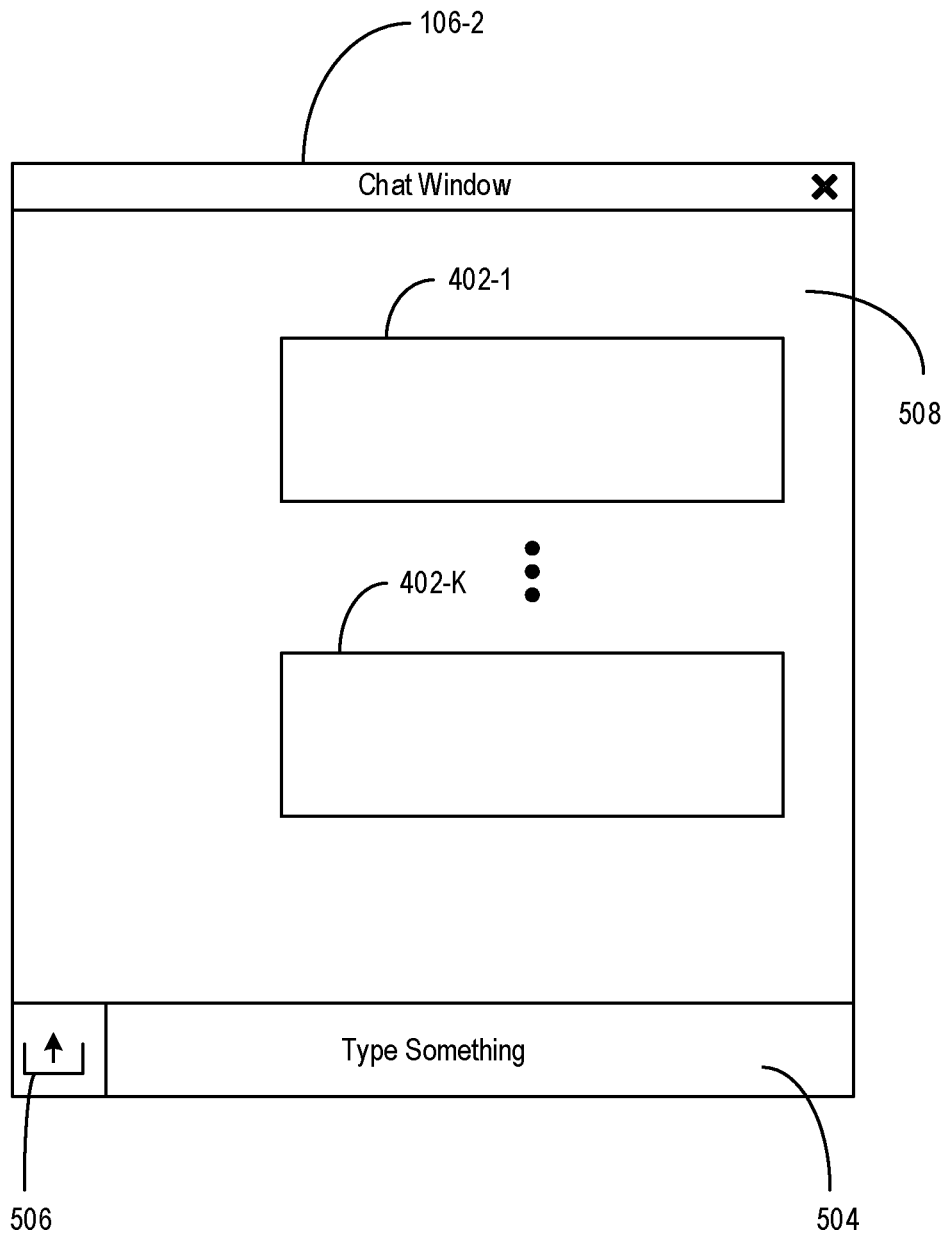
FIGS. 5A-5C illustrates different examples of a chat window that may be presented on a support agent device, in accordance with certain embodiments.
Figure 5B:
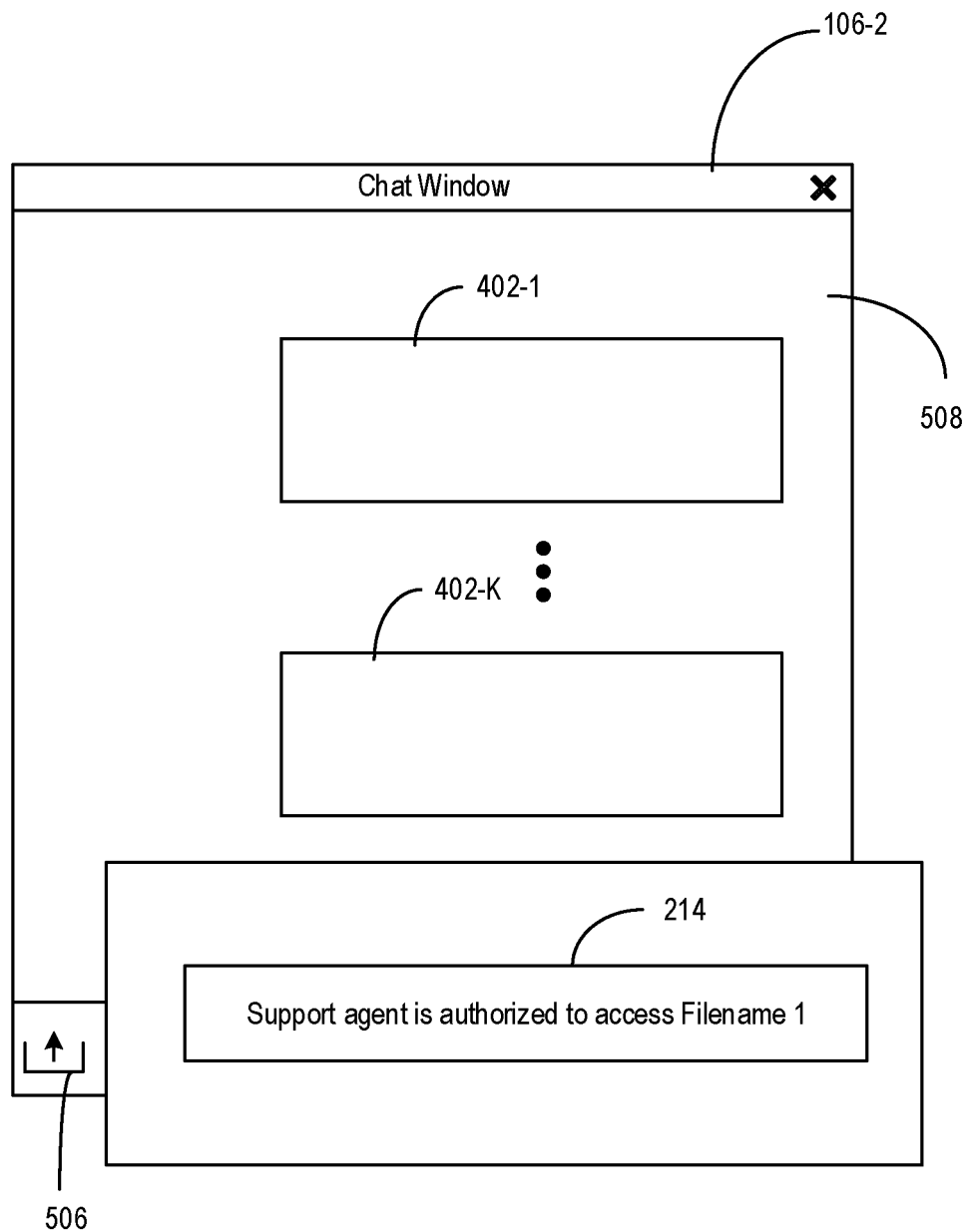
Figure 5C:
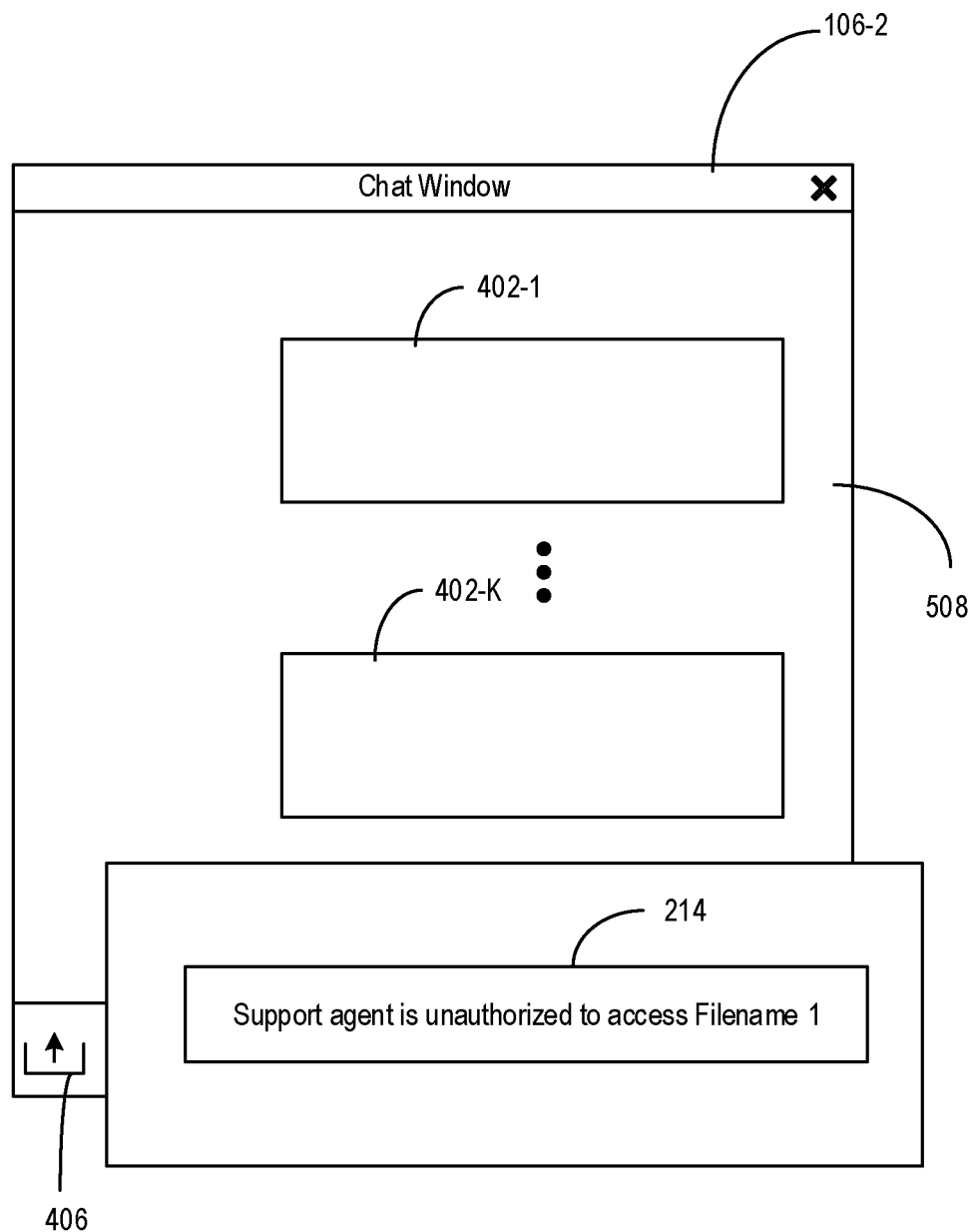

FIGS. 5A-5C illustrate different examples of a chat window (e.g., chat window 106-2) that may be presented on a user interface (e.g., user interface 132) of a support agent device (e.g., support agent device 130) during an interactive chat session between a user and a support agent, in accordance with certain aspects of the present disclosure. Similar to the chat window 106-1 depicted in FIG. 4A, as shown in FIG. 5A, the chat window 106-2 includes a window 508 for displaying a text-based thread (or chat) between the user and the support agent. For example, the window 508 can display one or more text messages 402 1-K of the text-based thread. The chat window 106-1 also includes a window 504 that allows the support agent to enter text for sending a message, and a prompt 406 that allows the support agent to upload an attachment (e.g., attach a file).

Continuing with the example described in FIG. 4B, assume the user selects to upload "Filename 1." In this example, as shown in FIG. 5B, the support agent may be presented with a message (e.g., message 214) indicating that "Support Agent is authorized to access Filename 1," when the server 120 determines that the support agent is authorized to access "Filename 1." On the other hand, as shown in FIG. 5C, the support agent may be presented with a message (e.g., message 214) indicating that "Support Agent is unauthorized to access Filename 1," when the server 120 determines that the support agent is unauthorized to access "Filename 1."

Figure 6:
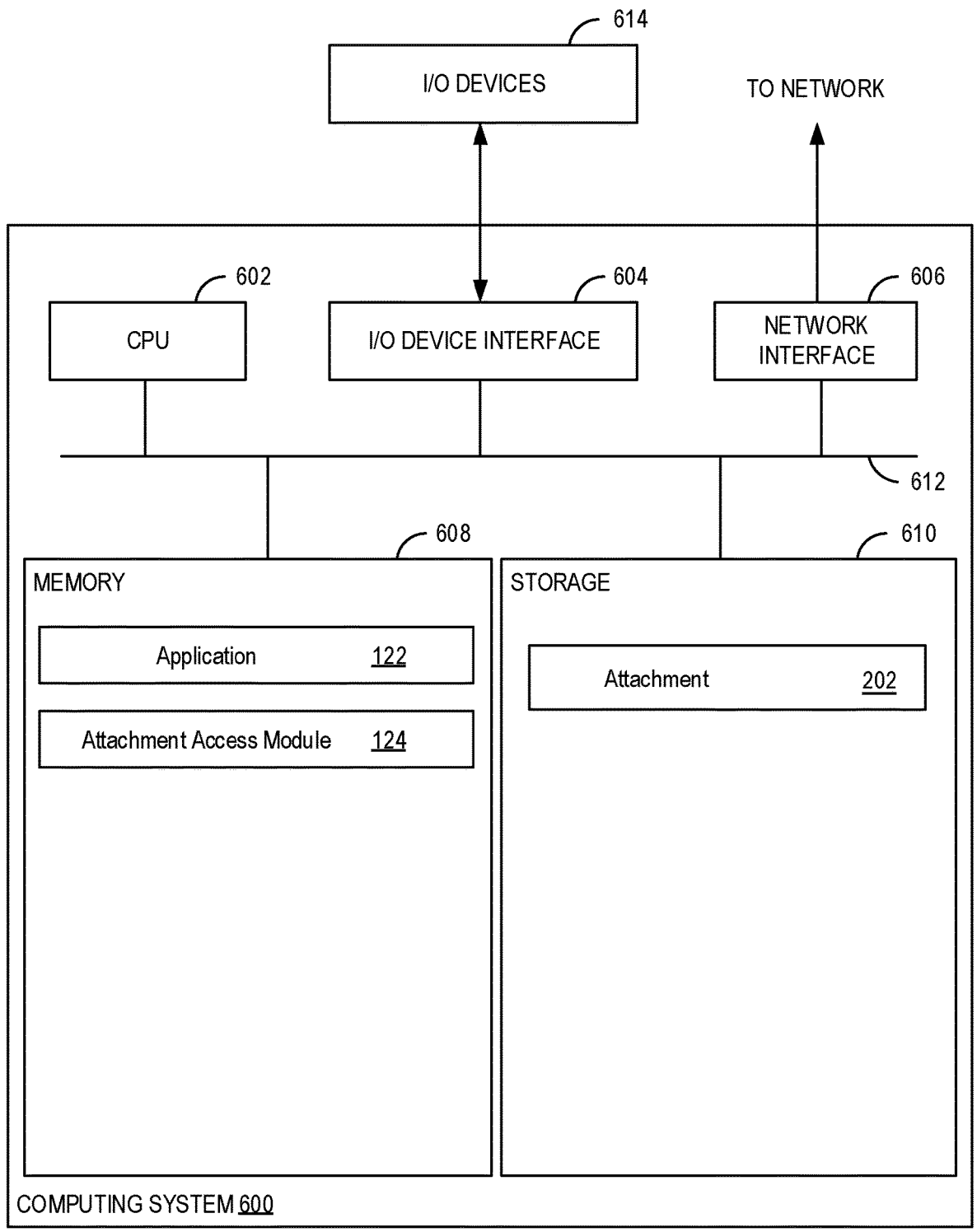
FIG. 6 illustrates an example computing system that performs screening of chat attachments, in accordance with certain embodiments.

FIG. 6 illustrates an exemplary computing system 600 that performs screening of chat attachments in accordance with aspects of the present disclosure. The computing system 600 is a representative example of the server 120 depicted in FIG. 1. As shown, the computing system 600 includes a central processing unit (CPU) 602, one or more I/O device interfaces 604, which may allow for the connection of various I/O devices 614 (e.g., keyboards, displays, mouse devices, pen input, etc.) to computing system 600, network interface 606 (which may include a transmitter for transmitting data and a receiver for receiving data), memory 608, storage 610, and interconnect 612. Storage 610 can be located either inside or outside the computing system 600. When the storage is located outside computing system 600, the storage can be connected via the network 140.

CPU 602 may retrieve and execute programming instructions stored in the memory 608. Similarly, CPU 602 may retrieve and store application data residing in the memory 608. Interconnect 612 transmits programming instructions and application data, among the CPU 602, I/O device interface 604, network interface 606, memory 608, and storage 610. CPU 602 can represent a single CPU, multiple CPUs, a single CPU having multiple processing cores, and the like. Additionally, memory 608 may represent volatile memory, such as random access memory. Furthermore, storage 610 may represent non-volatile memory, such as memory on a disk drive. Although shown as a single unit, storage 610 may be a combination of fixed or removable storage devices, such as fixed disc drives, removable memory cards or optical storage, network attached storage (NAS), or a storage area-network (SAN). As shown, memory 608 stores programming instructions for executing web application 122 and attachment access module 124, described in more detail above. Storage 510 stores an attachment(s) 202, described in more detail above.

EXAMPLE CLAUSES

Clause 1: A method comprising: monitoring a chat window of a first user interface of a first computing device associated with a first user during an interaction session between the first user of an application and a second user of the application, wherein the chat window comprises one or more elements for uploading at least one attachment; detecting, based on the monitoring, an upload of the at least one attachment; in response to detecting the upload of the at least one attachment, blocking access to the at least one attachment from a second computing device associated with the second user; identifying and extracting content from the at least one attachment; determining a type of the at least one attachment based on the content; determining whether the second user is authorized to access the type of the at least one attachment; and presenting an indication of the determination of whether the second user is authorized to access the type of the at least one attachment on at least one of the first user interface or a second user interface of a second computing device associated with the second user during the interaction session.

Clause 2: The method of Clause 1, further comprising: storing the at least one attachment in a storage system in response to detecting the upload of the at least one attachment, wherein identifying and extracting the content from the at least one attachment comprises retrieving the at least one attachment from the storage system and performing optical character recognition on the at least one attachment retrieved from the storage system.

Clause 3: The method of Clause 2, wherein: the access to the at least one attachment is blocked for a first period of time, and the method further comprises, upon determining that the second user is unauthorized to access the type of the at least one attachment: continuing to block access to the at least one attachment from the second computing device for a second period of time after the first period of time has elapsed; and removing the at least one attachment from the storage system.

Clause 4: The method of Clause 3, wherein continuing to block access to the at least one attachment comprises permanently blocking access to the at least one attachment after the first period of time has elapsed.

Clause 5: The method of Clause 2, wherein: the access to the at least one attachment is blocked for a period of time, and the method further comprises, upon determining that the second user is authorized to access the type of the at least one attachment: allowing access to the at least one attachment from the second computing device after the period of time has elapsed; and removing the at least one attachment from the storage system.

Clause 6: The method of any one of Clauses 1 through 5, wherein the type of the at least one attachment is determined based on evaluating the content using at least one of a rules engine or a machine learning model.

Clause 7: The method of Clause 6, wherein evaluating the content comprises classifying the at least one attachment into one of a plurality of different types of tax documents based on the content.

Clause 8: The method of Clause 7, wherein classifying the at least one attachment into one of the plurality of different types of tax documents comprises: generating a confidence score for each respective type of tax document based on the content; and selecting the type of tax document having a highest confidence score as the one of the plurality of different types of tax documents.

Clause 9: The method of any one of Clauses 1 through 8, wherein determining whether the second user is authorized to access the type of the at least one attachment is based on a set of permissions associated with the second user, a type of engagement between the first user and the second user during the interactive session, and the type of the at least one attachment.

Clause 10: The method of any one of Clauses 1 through 9, wherein the second user is a human support agent or a virtual support agent.

Clause 11: A method for screening chat attachments, comprising. monitoring a chat window of a first user interface of a first computing device associated with a first user during an interaction session between the first user of an application and a second user of the application, wherein the chat window comprises one or more elements for uploading at least one attachment; detecting, based on the monitoring, an upload of the at least one attachment; in response to detecting the upload of the at least one attachment, blocking access to the at least one attachment from a second computing device associated with the second user; while access to the at least one attachment is blocked: storing the at least one attachment in a first storage system that is inaccessible by a second computing device associated with the second user; retrieving the at least one attachment from the first storage system; identifying and extracting content from the at least one attachment retrieved from the first storage system; determining a type of the at least one attachment based on the content; and determining whether the second user is authorized to access the type of the at least one attachment; upon determining that the second user is authorized to access the type of the at least one attachment, unblocking access to the at least one attachment from the second computing device, comprising storing the at least one attachment in a second storage system that is accessible by the second computing device; and upon determining that the second user is unauthorized to access the type of the at least one attachment: continuing to block access to the at least one attachment from the second computing device; and removing the at least one attachment from the first storage system.

Clause 12: A system comprising: a memory having executable instructions stored thereon; and a processor configured to execute the executable instructions to cause the system to: monitor a chat window of a first user interface of a first computing device associated with a first user during an interaction session between the first user of an application and a second user of the application, wherein the chat window comprises one or more elements for uploading at least one attachment; detect, based on the monitoring, an upload of the at least one attachment; in response to detecting the upload of the at least one attachment, block access to the at least one attachment from a second computing device associated with the second user; identify and extracting content from the at least one attachment; determine a type of the at least one attachment based on the content; determine whether the second user is authorized to access the type of the at least one attachment; and present an indication of the determination of whether the second user is authorized to access the type of the at least one attachment on at least one of the first user interface or a second user interface of a second computing device associated with the second user during the interaction session.

Clause 13: The system of Clause 12, wherein the processor is further configured to execute the executable instructions to cause the system to: store the at least one attachment in a storage system in response to detecting the upload of the at least one attachment; retrieve the at least one attachment from the storage system; and perform optical character recognition on the at least one attachment retrieved from the storage system to identify and extract the content from the at least one attachment.

Clause 14: The system of Clause 13, wherein: the access to the at least one attachment is blocked for a first period of time; and the processor is further configured to execute the executable instructions to cause the system to, upon determining that the second user is unauthorized to access the type of the at least one attachment: continue to block access to the at least one attachment from the second computing device for a second period of time after the first period of time has elapsed; and remove the at least one attachment from the storage system.

Clause 15: The system of Clause 14, wherein continuing to block access to the at least one attachment comprises permanently blocking access to the at least one attachment after the first period of time has elapsed.

Clause 16: The system of Clause 13, wherein: the access to the at least one attachment is blocked for a period of time; and the processor is further configured to execute the executable instructions to cause the system to, upon determining that the second user is authorized to access the type of the at least one attachment: allow access to the at least one attachment from the second computing device after the period of time has elapsed; and remove the at least one attachment from the storage system.

Clause 17: The system of any one of Clauses 12 through 16, wherein the type of the at least one attachment is determined based on evaluating the content using at least one of a rules engine or a machine learning model.

Clause 18: The system of Clause 17, wherein evaluating the content comprises classifying the at least one attachment into one of a plurality of different types of tax documents based on the content.

Clause 19: The system of Clause 18, wherein classifying the at least one attachment into one of the plurality of different types of tax documents comprises: generating a confidence score for each respective type of tax document based on the content; and selecting the type of tax document having a highest confidence score as the one of the plurality of different types of tax documents.

Clause 20: The system of any one of Clauses 12 through 19, wherein determining whether the second user is authorized to access the type of the at least one attachment is based on a set of permissions associated with the second user, a type of engagement between the first user and the second user during the interactive session, and the type of the at least one attachment.

Clause 21: An apparatus comprising: a memory having executable instructions stored thereon; and a processor configured to execute the executable instructions to cause the apparatus to perform the methods of any one of Clauses 1 through 11.

Clause 22: An apparatus comprising: means for performing the methods of any one of Clauses 1 through 11.

Clause 23: A computer-readable medium having instructions stored thereon which, when executed by a processor, performs the methods of any one of Clauses 1 through 11.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
   detecting an upload of at least one attachment by a first user during a session of an application between the first user and a second user of the application, wherein the session comprises one or more elements for uploading the at least one attachment;
   in response to detecting the upload of the at least one attachment, blocking access to the at least one attachment from a second computing device associated with the second user;
   identifying and extracting content from the at least one attachment;
   determining a type of the at least one attachment based on the content;
   determining whether the second user is authorized to access the type of the at least one attachment based on a set of permissions associated with the second user, a type of engagement between the first user and the second user during the session, and the type of the at least one attachment, the type of the engagement between the first user and the second user comprising a selection from a plurality of types of engagement corresponding to a plurality of possible attachment types for the at least one attachment; and
   performing one or more actions in the application based on whether the second user is authorized to access the type of the at least one attachment.

2. The method of claim 1, further comprising:
   storing the at least one attachment in a storage system in response to detecting the upload of the at least one attachment,
   wherein identifying and extracting the content from the at least one attachment comprises retrieving the at least one attachment from the storage system and performing optical character recognition on the at least one attachment retrieved from the storage system.

3. The method of claim 2, wherein:
   the access to the at least one attachment is blocked for a first period of time,
   and the method further comprises, upon determining that the second user is unauthorized to access the type of the at least one attachment:
   continuing to block access to the at least one attachment from the second computing device for a second period of time after the first period of time has elapsed; and
   removing the at least one attachment from the storage system.

4. The method of claim 3, wherein continuing to block access to the at least one attachment comprises permanently blocking access to the at least one attachment after the first period of time has elapsed.

5. The method of claim 2, wherein:
   the access to the at least one attachment is blocked for a period of time,
   and the method further comprises, upon determining that the second user is authorized to access the type of the at least one attachment:
   allowing access to the at least one attachment from the second computing device after the period of time has elapsed; and
   removing the at least one attachment from the storage system.

6. The method of claim 1, wherein the type of the at least one attachment is determined based on evaluating the content using at least one of a rules engine or a machine learning model.

7. The method of claim 6, wherein evaluating the content comprises classifying the at least one attachment into one of a plurality of different types of tax documents based on the content, the plurality of different types of tax documents including a plurality of business type tax documents and a plurality of personal type tax documents, where the at least one of the rules engine or machine learning model is used to classify the at least one attachment into a business type tax document or a personal type tax document, the type of engagement is selected from a business type engagement or a personal type engagement, and the determining whether the second user is authorized to access the type of the at least one attachment is based on the type of engagement matching the type of the at least one attachment.

8. The method of claim 7, wherein evaluating the content further comprises classifying the at least one attachment into one of a plurality of different types of tax documents by:
   generating a confidence score for each respective type of tax document based on the content; and
   selecting the type of tax document having a highest confidence score as the one of the plurality of different types of tax documents.

9. The method of claim 1, wherein the upload of the at least one attachment is to a first storage system, the method further comprising obtaining, from a second storage system the set of permissions associated with the second user, the type of engagement between the first user and the second user during the session, and the type of the at least one attachment.

10. The method of claim 1, wherein the second user is a human support agent or a virtual support agent.

11. A system comprising:
    a memory having executable instructions stored thereon; and
    a processor configured to execute the executable instructions to cause the system to:
    detect an upload of at least one attachment by a first user during a session of an application between the first user and a second user of the application, wherein the session comprises one or more elements for uploading the at least one attachment;
    in response to detecting the upload of the at least one attachment, blocking access to the at least one attachment from a second computing device associated with the second user;
    identify and extract content from the at least one attachment;
    determine a type of the at least one attachment based on the content;
    determine whether the second user is authorized to access the type of the at least one attachment based on a set of permissions associated with the second user, a type of engagement between the first user and the second user during the session, and the type of the at least one attachment, the type of the engagement between the first user and the second user comprising a selection from a plurality of types of engagement corresponding to a plurality of possible attachment types for the at least one attachment; and
    perform one or more actions in the application based on whether the second user is authorized to access the type of the at least one attachment.

12. The system of claim 11, wherein the processor is further configured to execute the executable instructions to cause the system to:

store the at least one attachment in a storage system in response to detecting the upload of the at least one attachment;

retrieve the at least one attachment from the storage system; and perform optical character recognition on the at least one attachment retrieved from the storage system to identify and extract the content from the at least one attachment.

13. The system of claim 12, wherein:

the access to the at least one attachment is blocked for a first period of time; and the processor is further configured to execute the executable instructions to cause the system to, upon determining that the second user is unauthorized to access the type of the at least one attachment:

continue to block access to the at least one attachment from the second computing device for a second period of time after the first period of time has elapsed; and remove the at least one attachment from the storage system.

14. The system of claim 13, wherein continuing to block access to the at least one attachment comprises permanently blocking access to the at least one attachment after the first period of time has elapsed.

15. The system of claim 12, wherein:

the access to the at least one attachment is blocked for a period of time; and the processor is further configured to execute the executable instructions to cause the system to, upon determining that the second user is authorized to access the type of the at least one attachment:

allow access to the at least one attachment from the second computing device after the period of time has elapsed; and remove the at least one attachment from the storage system.

16. The system of claim 11, wherein the type of the at least one attachment is determined based on evaluating the content by using at least one of a rules engine or a machine learning model.

17. The system of claim 16, wherein evaluating the content comprises classifying the at least one attachment into one of a plurality of different types of tax documents based on the content, the plurality of different types of tax documents including a plurality of business type tax documents and a plurality of personal type tax documents, where the at least one of the rules engine or machine learning model is used to classify the at least one attachment into a business type tax document or a personal type tax document, the type of engagement is selected from a business type engagement or a personal type engagement, and the determining whether the second user is authorized to access the type of the at least one attachment is based on the type of engagement matching the type of the at least one attachment.

18. The system of claim 17, wherein evaluating the content further comprises classifying the at least one attachment into one of a plurality of different types of tax documents by:

generating a confidence score for each respective type of tax document based on the content; and selecting the type of tax document having a highest confidence score as the one of the plurality of different types of tax documents.

19. The system of claim 11, wherein the upload of the at least one attachment is to a first storage system, and the processor is further configured to execute the executable instructions to cause the system to obtain, from a second storage system the set of permissions associated with the second user, the type of engagement between the first user and the second user during the session, and the type of the at least one attachment.

20. A method for screening attachments, comprising:

detecting, an upload of at least one attachment using a first user interface of a first computing device associated with a first user during an interactive session of an application between the first user of the application and a second user of the application, the application including an element for uploading the at least one attachment;

in response to detecting the upload of the at least one attachment, blocking access to the at least one attachment from a second computing device associated with the second user;

while access to the at least one attachment is blocked:

storing the at least one attachment in a first storage system that is inaccessible by a second computing device associated with the second user;

retrieving the at least one attachment from the first storage system;

identifying and extracting content from the at least one attachment retrieved from the first storage system;

determining a type of the at least one attachment based on the content; and determining whether the second user is authorized to access the type of the at least one attachment, based on a set of permissions associated with the second user, a type of engagement between the first user and the second user during the interactive session, and the type of the at least one attachment, the type of the engagement between the first user and the second user comprising a selection from a plurality of types of engagement corresponding to a plurality of possible attachment types for the at least one attachment;

upon determining that the second user is authorized to access the type of the at least one attachment, unblocking access to the at least one attachment from the second computing device, comprising storing the at least one attachment in a second storage system that is accessible by the second computing device; and upon determining that the second user is unauthorized to access the type of the at least one attachment:

continuing to block access to the at least one attachment from the second computing device; and removing the at least one attachment from the first storage system.

* * * * *